J. N. TUTTLE.
RECORDER.
APPLICATION FILED OCT. 13, 1919.

1,415,499.

Patented May 9, 1922.

Driven by Constant Speed Mechanism.

Inventor,
James N. Tuttle,
by Albert G. Davis
His Attorney.

UNITED STATES PATENT OFFICE.

JAMES N. TUTTLE, OF BOSTON, MASSACHUSETTS, ASSIGNOR TO GENERAL ELECTRIC COMPANY, A CORPORATION OF NEW YORK.

RECORDER.

1,415,499. Specification of Letters Patent. Patented May 9, 1922.

Application filed October 13, 1919. Serial No. 330,257.

*To all whom it may concern:*

Be it known that I, JAMES N. TUTTLE, a citizen of the United States, residing at Boston, in the county of Suffolk, State of Massachusetts, have invented certain new and useful Improvements in Recorders, of which the following is a specification.

This invention relates to a recording device, and more particularly to the curve drawing variety. My invention is not restricted to any particular kind of curve drawing instrument, but may readily be applied to any of them.

One object of my invention is to obtain a legible record upon the record sheet without the use of ink or pencil marks.

Another object is to eliminate friction between the record sheet and the stylus and in this way increase the durability, as well as the accuracy of the recording device.

Another object is to provide a stylus adapted to operate in such a manner as to obviate the necessity of any marking material, and to eliminate friction.

Other objects and advantages of my invention will be apparent as the description proceeds.

In the accompanying drawing which illustrates my invention, there is shown a curve drawing instrument, for example, a voltmeter, which is supplied with my improved recording means.

Figure 1:
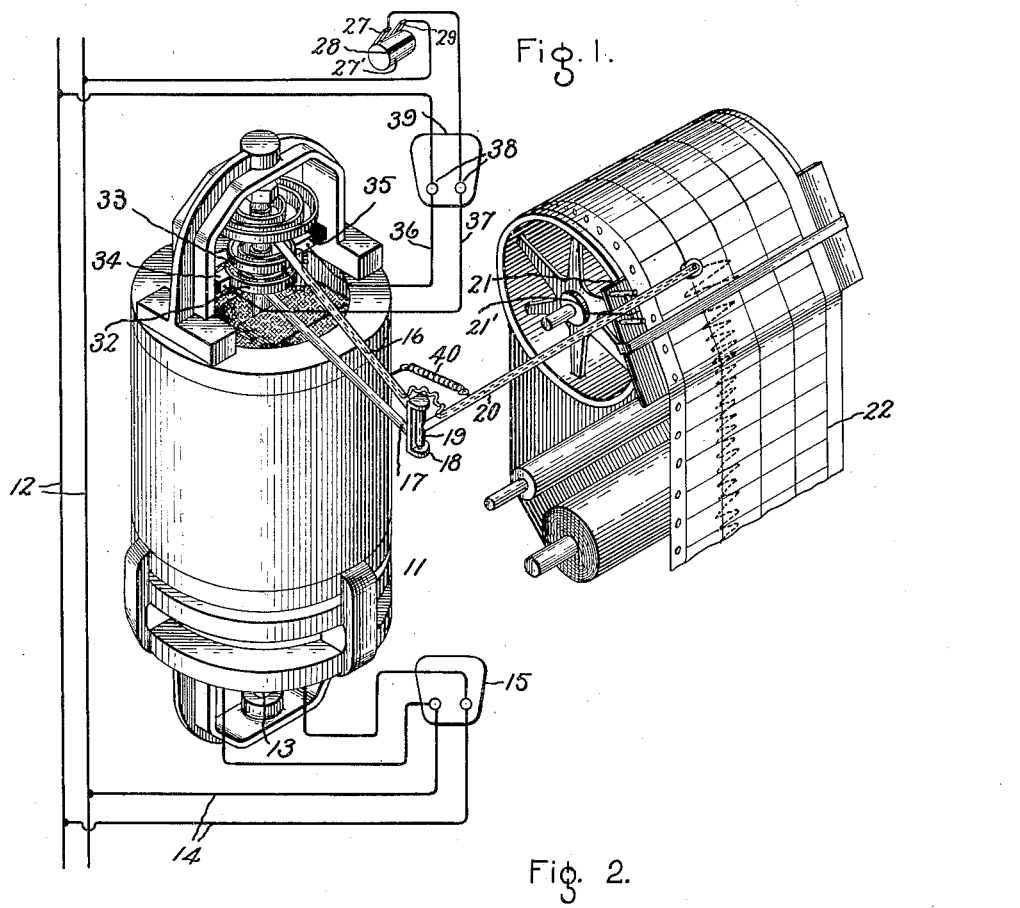
Figure 2:
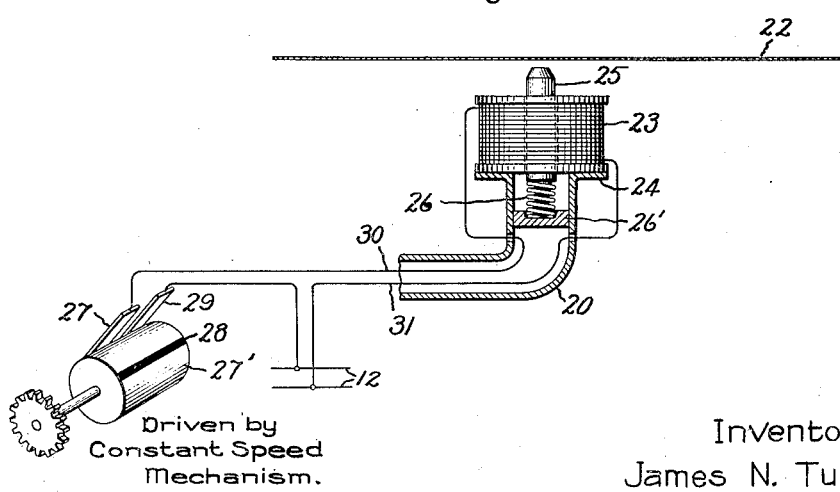

Fig. 1 is a general perspective view showing the record sheet, stylus and the curve drawing instrument, and Fig. 2 is a detail view showing the construction of the stylus.

Referring now more particularly to the drawing wherein like parts are similarly indexed throughout, the curve drawing instrument 11, herein shown as a voltmeter adapted to measure and record the voltage on a supply circuit 12, is provided with a longitudinal shaft 13 suitably supported at its ends by bearings, not shown. The actuating coil of the voltmeter is connected to the mains 12 by wires 14 through the terminal block 15. Since the voltmeter may be of any well known construction and since it is immaterial as far as my device is concerned just what form of instrument is used, I shall not describe said voltmeter in any great detail.

The shaft 13 of the voltmeter carries the hollow tube 16 and the rod 17 near its upper end, said tube and rod serving to support the U-shaped bearing 18 for the vertically disposed shaft 19. Said shaft 19 carries the tube-like member 20 guided in its transverse movement by appropriate stationary guides and supports 21, 21', and is held in its path of movement by spring 40 fastened to members 16 and 20. The movement of the member 20 is effected by the actuation of the voltmeter shaft 13 due to variations in the voltage of the supply mains 12, as is well understood. A record sheet 22 is advanced at a uniform rate by suitable clockwork mechanism not shown, and is properly calibrated to facilitate reading the value of the voltage at any particular instant. The upper surface of this record sheet is made sensitive to heat by the use of any well known chemical means, such, for example, as a solution of normal copper nitrate. The solution is applied to the surface, and when dry, said surface acquires a brownish stain if exposed to heat of a proper temperature.

The tube-like member 20 carries at its free end a coil 23, the axis of which is normal to the surface of the record sheet 22. An appropriate flange 24 is provided at the free extremity of the member 20 for the support of the coil 23. A stylus of solid magnetic material is disposed within the coil 23 so as to be pulled away from the record sheet 22 thereby when the circuit through the coil is completed. Said stylus serves therefore as a core for the coil, and is also provided at its free end with a conical point for reducing its effective area, which is adapted to engage the sheet 22. The stylus 25 is adapted to be urged toward the sheet 22 by a coiled compression spring 26, supported at its other extremity by a suitable supporting means 26'. This support is held in the tube-like member 20 in any appropriate manner. The spring 26 is so designed that it is capable of urging the stylus into contact with the record sheet when the coil 23 is deenergized. When the magnet 23, however, is energized, the stylus 25 is pulled away from the surface of the record sheet 22.

The wires 30 and 31 are led through the tube-like members 20 and 16 to a pair of helical conducting members 32 and 33 surrounding the shaft 13 of instrument 11. These conductors are oppositely wound so as not to hinder the free operation of the instrument 11. Stationary posts 34 and 35 serve as terminals for said members 32 and 33 and these terminals are in turn connected by wires 36 and 37 to the terminal posts 38 carried on the terminal block 39. One of the wires leading from the terminal block, is connected directly to one of the mains 12, as shown, while the other wire is connected to a brush 27 bearing on a conducting cylinder 27' rotated at a uniform rate; say, once every minute or thirty seconds. The actuating means for the cylinder may, for example, be the clockwork adapted to rotate the drum for the record sheet. A portion 28 of the cylinder is made non-conducting. Another brush 29 placed adjacent to the brush 27 also bears upon this cylinder. Once in every revolution of the cylinder 27' the non-conducting portion 28 comes under the brushes 27 and 29 and interrupts the electrical connection between them. This interruption lasts only for a comparatively short interval. The brush 29 is connected to the other one of the mains 12. It is to be understood that any other means for periodically interrupting the circuit may be employed.

Assuming that the cylinder 27' is in the position shown in Fig. 2, a circuit will be completed through the wires 36 and 37, the binding posts 34 and 35, the conductors 32 and 33, wires 30 and 31, and coil 23. The stylus 25 is pulled away from the surface of the record sheet 22, due to the energization of the coil 23. As the cylinder 27' is rotated, the non-conducting portion 28 will for a short period interrupt the circuit just traced. When this occurs the coil 23 is de-energized, and the compression spring 26 may now act to urge the stylus 25 toward the record sheet 22. The stylus 25 is made of solid magnetic material so that it may readily be heated by the eddy currents set up in it due to the energization of coil 23 from the mains 12. Should the instrument 11 be connected to direct current mains, by a proper design of the coil 23, there may be sufficient resistance in the wire on said coil so as to develop a sufficient amount of heat in the stylus 25. When this stylus, therefore, touches the sensitized surface of the recording sheet 22 it serves to set up the chemical reaction necessary for leaving a permanent stain on the sheet, but without igniting said sheet. Since the stylus is in contact with the sheet 22 only momentarily for one revolution of the cylinder 27', it does not interfere with the free movement of the sheet 22. The device, therefore, is adapted to record accurately the variations of the quantity measured by instrument 11. The relative movement of the stylus 25 and the record sheet 22 is traced as a series of small dots where the tip of the stylus has touched the sensitized surface. These dots are close enough together to make substantially a continuous curve.

From the foregoing description it can be seen that an extremely efficient device has been obtained for the purpose described, and that the stylus itself may be installed with comparative facility upon any curve drawing instrument. Although as described the stylus is reciprocated and heated by the same element, namely, the coil 23, it is to be understood that any other apparatus for performing these two functions may be used.

While I have shown in the accompanying drawings the preferred embodiment of my device, my invention is not limited thereto, and I aim in the appended claims to embrace all modifications falling fairly within the scope of my invention.

What I claim as new and desire to secure by Letters Patent of the United States, is:—

1. In a recorder, a record sheet provided with a surface sensitive to heat, a heated stylus relatively movable thereto, and means for periodically moving said stylus to and from the surface of said sheet, said surface being adapted to indicate where the stylus has been in contact therewith.

2. In a recording device, a record sheet provided with a surface sensitive to heat and adapted to be advanced at a uniform rate, a stylus relatively movable to said sheet, and adapted to be moved in accordance with a quantity to be measured, a coil adapted to be connected to a source of current for imparting another movement to said stylus, said latter movement being substantially normal to the surface of the sheet, means for periodically interrupting the circuit for said coil, whereby a reciprocating movement is imparted to the stylus, said coil also adapted to heat said stylus.

3. A stylus comprising in combination a core of solid magnetic material, a coil for moving said core, a spring tending to move said core in a direction opposite to that due to the coil, said coil also serving as a heating means for said core.

4. The method of producing a record upon a record sheet which consists in treating a surface of said sheet in such a way that a chemical stain is produced thereon upon application of heat, alternately bringing a heated stylus in close proximity to said surface and separating said stylus and sheet, and repeating this operation in succession so rapidly that the relative movement of the stylus and sheet is recorded as a dotted line.

In witness whereof I have set my hand this 10th day of October, 1919.

JAMES N. TUTTLE.